United States Patent
Jadon et al.

(10) Patent No.: US 7,293,197 B2
(45) Date of Patent: Nov. 6, 2007

(54) NON-VOLATILE MEMORY WITH NETWORK FAIL-OVER

(75) Inventors: Mike Jadon, Los Angeles, CA (US); Robert Lercari, Sun Valley, CA (US); Richard M. Mathews, Northridge, CA (US); William R. Peebles, Simi Valley, CA (US); Phap Nguyen, Reseda, CA (US); Mark Kampe, Los Angeles, CA (US)

(73) Assignee: Micro Memory LLC, Chatsworth, CA (US)

( * ) Notice: Subject to any disclaimer, the term of this patent is extended or adjusted under 35 U.S.C. 154(b) by 485 days.

(21) Appl. No.: 10/824,852

(22) Filed: Apr. 14, 2004

(65) Prior Publication Data

US 2005/0039090 A1 Feb. 17, 2005

Related U.S. Application Data

(60) Provisional application No. 60/494,696, filed on Aug. 13, 2003.

(51) Int. Cl.
G06F 11/00 (2006.01)
(52) U.S. Cl. .......................... 714/14; 714/22
(58) Field of Classification Search ............... 714/14, 714/22
See application file for complete search history.

(56) References Cited

U.S. PATENT DOCUMENTS

| | | | |
|---|---|---|---|
| 5,708,820 A * | 1/1998 | Park et al. ................. 713/323 |
| 5,864,659 A * | 1/1999 | Kini ............................ 714/31 |
| 5,937,169 A | 8/1999 | Connery et al. ......... 395/200.8 |
| 5,966,510 A * | 10/1999 | Carbonneau et al. ......... 714/44 |
| 6,038,689 A * | 3/2000 | Schmidt et al. ............... 714/48 |
| 6,085,273 A | 7/2000 | Ball et al. ................... 710/129 |
| 6,094,699 A | 7/2000 | Surugucchi et al. ........ 710/128 |
| 6,181,630 B1 | 1/2001 | Caulkins ..................... 365/228 |
| 6,219,693 B1 | 4/2001 | Napolitano et al. ......... 709/203 |
| 6,249,831 B1 | 6/2001 | Allingham .................. 710/126 |
| 6,298,408 B1 | 10/2001 | Park ........................... 710/129 |
| 6,363,444 B1 | 3/2002 | Platko et al. ................ 710/110 |
| 6,385,685 B1 | 5/2002 | Dell et al. ................... 710/305 |
| 6,389,546 B1 * | 5/2002 | Kano et al. .................. 713/340 |
| 6,473,355 B2 | 10/2002 | Caulkins ..................... 365/228 |
| 6,567,859 B1 | 5/2003 | Yang et al. .................. 709/250 |
| 6,587,970 B1 * | 7/2003 | Wang et al. .................. 714/47 |
| 6,643,209 B2 | 11/2003 | Caulkins ..................... 369/228 |
| 6,651,190 B1 * | 11/2003 | Worley et al. ................ 714/43 |
| 7,028,154 B2 * | 4/2006 | Reeves ....................... 711/162 |
| 2002/0067652 A1 | 6/2002 | Caulkins ..................... 365/228 |
| 2002/0191471 A1 | 12/2002 | Caulkins ..................... 365/226 |
| 2003/0088735 A1 | 5/2003 | Busser et al ................ 711/114 |
| 2003/0172216 A1 | 9/2003 | Gundacker .................. 710/300 |
| 2004/0078663 A1 * | 4/2004 | Inaba ........................... 714/22 |
| 2005/0039090 A1 * | 2/2005 | Jadon et al. ................. 714/718 |

* cited by examiner

Primary Examiner—Bryce P Bonzo
(74) Attorney, Agent, or Firm—Sheppard, Mullin, Richter & Hampton LLP (57) ABSTRACT

An NVRAM fail-over controller including a NVRAM device connected to a host computer, the host computer having the ability to directly control the NVRAM device. The NVRAM fail-over controller includes an embedded processor that is powered by back-up power. The NVRAM fail-over controller includes a network interface that is powered by back-up power.

19 Claims, 6 Drawing Sheets

NON-VOLATILE MEMORY WITH NETWORK FAIL-OVER

CROSS-REFERENCE TO RELATED APPLICATION

Priority is claimed under 35 U.S.C. § 119(e) to U.S. Provisional Patent Application No. 60/494,696, filed on Aug. 13, 2003, entitled "Memory Card and Related Methods for Using It" by Mike Jadon, which is incorporated by reference herein.

TECHNICAL FIELD OF THE INVENTION

The present invention relates generally to peripheral controllers for data storage. More particularly, it relates to enhancements to non-volatile memory systems.

BACKGROUND OF THE INVENTION

There is very great demand for high-speed stable storage. Disks provide stable storage, but latency and transfer times can be high.

Non-volatile random-access memory (NVRAM) can be use to improve performance in a number of ways to improve response time and data reliability in server appliances. NVRAM may consist of random-access memory that does not require power to retain data or Dynamic Random-Access Memory (DRAM) or Synchronous DRAM (SDRAM) that has secondary power such as battery or an external universal power supply (UPS).

Figure 1:
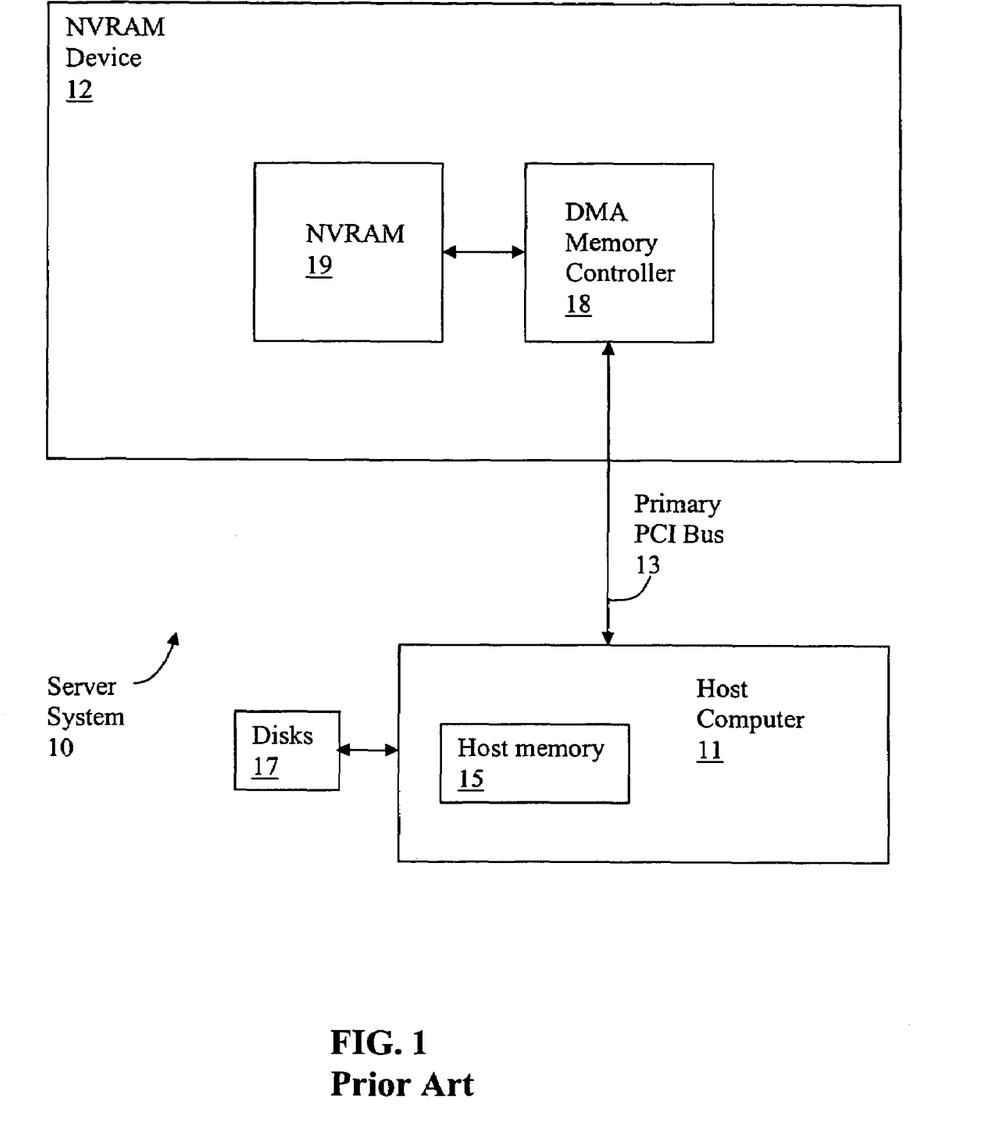
FIG. 1 is a block diagram of a prior art PCI NVRAM device.

One such prior-art application is shown in FIG. 1. The host computer 11 may write important data to disks 17. When time is critical, it may instead store data to the faster NVRAM device 12. The DMA memory controller 18 manages the NVRAM 19 and provides direct memory access (DMA) services. DMA is used to transfer data in either direction between host memory 15 and NVRAM 19 across an industry-standard peripheral component interconnect (PCI) bus 13. DMA performs transfers while the host computer 11 performs other operations, relieving the host computer 11 of those duties. The data stored in NVRAM 19 may be a cache of data that will eventually be written to disks 17, a journal of changes to the disks 19 that may be replayed to recover from a system failure but which never needs to be written to disks 17, or other information about transactions that may eventually be processed causing related data to be written to disks 17.

This application allows the host computer 11 to directly control the NVRAM device 12, but it does not allow the NVRAM 19 to be used together efficiently with the disks 17. Data moving from NVRAM to disk must pass through the primary bus 13. This can reduce performance because the bus must be shared with other device transactions. Another disadvantage of this scheme is that NVRAM device 12 requires its own location on the primary bus 13 rather than sharing one with the controller for the disks 17. Locations on the bus often are not easily made available.

Figure 2A:
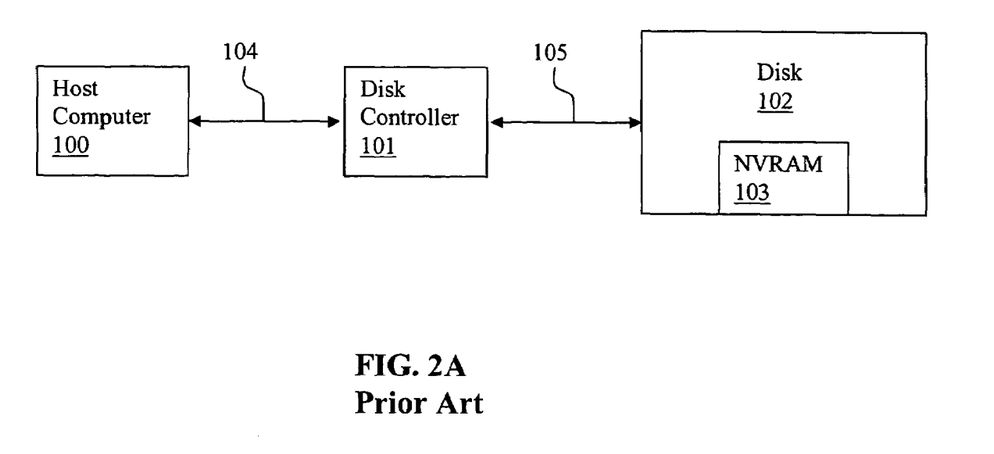
FIG. 2A illustrates a prior art disk device that includes NVRAM.

FIG. 2A shows a prior-art implementation in which NVRAM is attached to a storage device. The host computer 100 is attached to a disk controller 101 by an interface 104, possibly a PCI bus. The disk controller is attached to a disk or other storage device 102. The interface 105 may be a local bus such as Small Computer System Interface (SCSI) or AT-attached (ATA). The disk 102 may also be replaced by an intelligent storage device such as network-attached storage (NAS) or a storage area network (SAN) device. In this case interface 105 may be a network or fibre channel connection. The NVRAM 103 is under complete control of the disk or storage device 102. The host computer 100 has no way to access the NVRAM contents using interface 105.

Figure 2B:
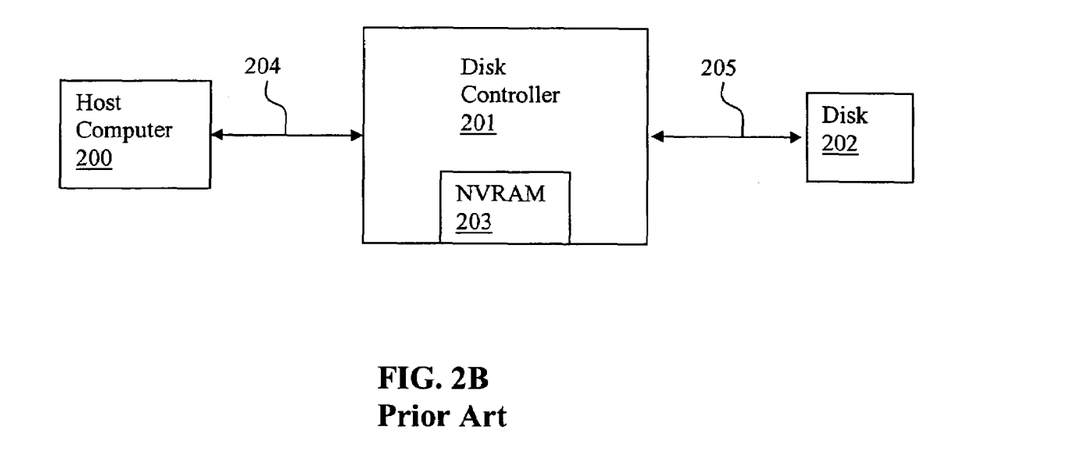
FIG. 2B illustrates a prior art RAID controller that includes NVRAM.

FIG. 2B is similar to FIG. 2A except that the NVRAM 203 has moved to the disk controller 201. The disk controller may manage disks 202 as a JBOD (Just a Bunch of Disks) or a RAID (Redundant Array of Independent Disks) system. When the host computer 200 makes a request to the disk controller 201, the controller may choose to cache data in the NVRAM 203. Management of the NVRAM is the responsibility of the disk controller. This includes algorithms for deciding when data cached in NVRAM will be transferred to disk and when it will be discarded.

The solutions in FIGS. 2A and 2B solve the problem of keeping the NVRAM data close to the disks, but they take control of the NVRAM away from the host computer. Usually the host computer has a much better idea of how data is being used than does the disk or the disk controller. The host can know if data is temporary in nature and never needs to be copied to disk. The host can know if the data is likely to be modified again soon and thus disk accesses can be reduced if the data is not immediately copied to disk. The host can know if data will no longer be needed and can be removed from cache once it is on disk.

In all of the three above prior-art systems, when the original device that contains the NVRAM (the host computer, the disk, or the disk controller) fails, the NVRAM keeps data preserved. When the original device is restored to use, it can get the data from the NVRAM. Until the original device is restored to use, the data remains unavailable. It is often desirable to have a replacement device in system (such as a network cluster) take over when a similar original device fails. Because the NVRAM data is not available while its original device is not available, the replacement device cannot take over the function of the original device because it cannot get access to the necessary data.

Figure 3:
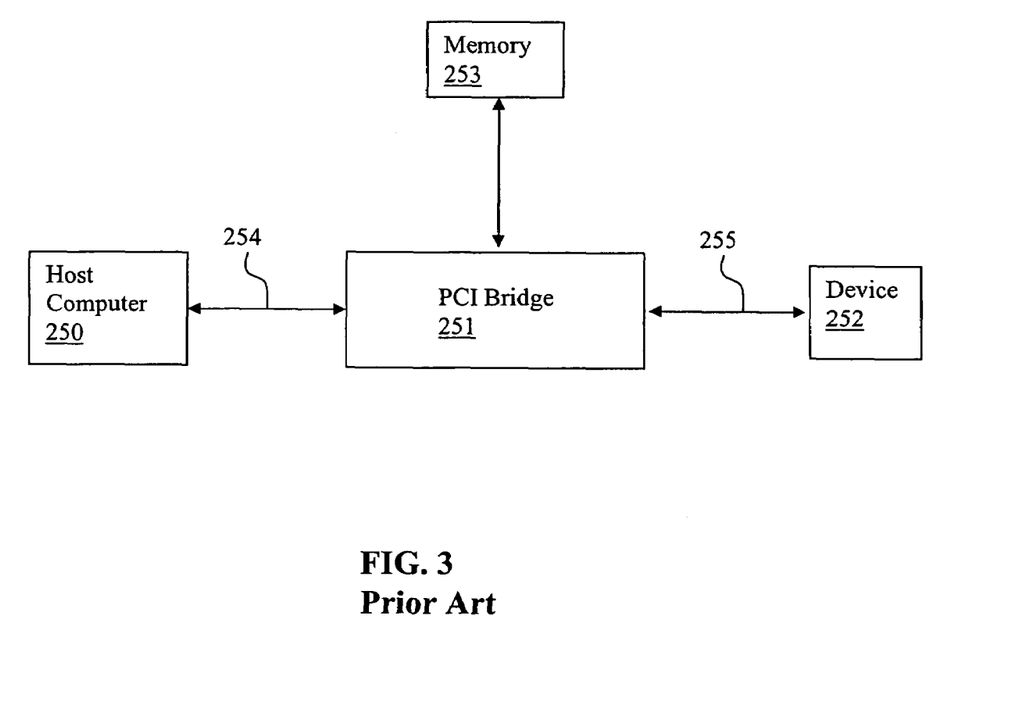
FIG. 3 illustrates a prior art PCI bridge with SDRAM.

There are other prior art applications that utilize bus bridges. These bus bridges often include local memory that is a subset of the bridge. FIG. 3 illustrates a host computer 250 that connects to one or more devices 252 through a PCI bus bridge. Information on PCI bus 254 is forwarded by the bridge 251 to PCI bus 255 as necessary to reach the target device 252. Information on PCI bus 255 is forwarded by the bridge 251 to PCI bus 254 as necessary to reach the host computer 250. The PCI bridge 251 may use local bridge memory 253 temporarily to store the data that flows through the bridge. Data coming from bus 254, for example, may be stored in the bridge's memory until bus 255 is available and device 252 is ready to receive the data. This memory is used by the PCI bridge 251 to make its routing function more efficient. There is no way for the host computer 250 to directly control this memory, specifically where the bridge 251 puts this data or when it is removed from memory 253. From the perspective of the host computer 250, it is writing the data directly to the device 252 except for a time delay in having the data reach the device. While the present invention utilizes some of these same bus bridge devices with associated local memory, it should be noted that the local bus bridge memory 253 is a subset of the bridge that is transparent to the host computer. This is unlike NVRAM 19 in FIG. 1 or NVRAM 309 in FIG. 4, which are endpoint devices that can be directly controlled by the host computer.

Accordingly, it is an object of the present invention to provide NVRAM that may be fully controlled by the host computer.

Another object of the present invention is to provide NVRAM on the host computer, and after a failure of said host computer such NVRAM could still be accessed by other host computers. In particular, the NVRAM and associated communication devices and processors must remain functioning when the host computer is unavailable due to internal failure, scheduled shutdown, power failure, or other errors.

Another object of the present invention is to provide NVRAM in a highly available system that can protect components of the system from failure of other components of the system. Failure of components on the NVRAM device must be detected and be able to be isolated to protect the host computer. Failure of components of the host computer must be able to be isolated to allow the NVRAM device to communicate data despite such failures.

Another object of the present invention is to provide NVRAM in the host computer, and said NVRAM can share a primary bus connection to the host computer with another device needed in the host computer.

Another object of the present invention is to provide NVRAM that can be connected to disk controllers by private data paths.

SUMMARY OF THE INVENTION

The present invention combines NVRAM under control of the host computer with a processor and network connection that may be powered from secondary sources such as batteries. After failure of the host computer, other computers may still access NVRAM through the network connection. Unlike many disk/RAID controllers that have a processor that takes control of the NVRAM, the present invention leaves the NVRAM to be used by the host. A plurality of private buses is used in the present invention to distribute load on the buses, to isolate different parts of the system in case of failure, and to provide private data paths between NVRAM and other components of the controller. The NVRAM controller may act as a DMA master. Additional devices may be added through a mezzanine connection.

DETAILED DESCRIPTION OF THE INVENTION

Figure 4:
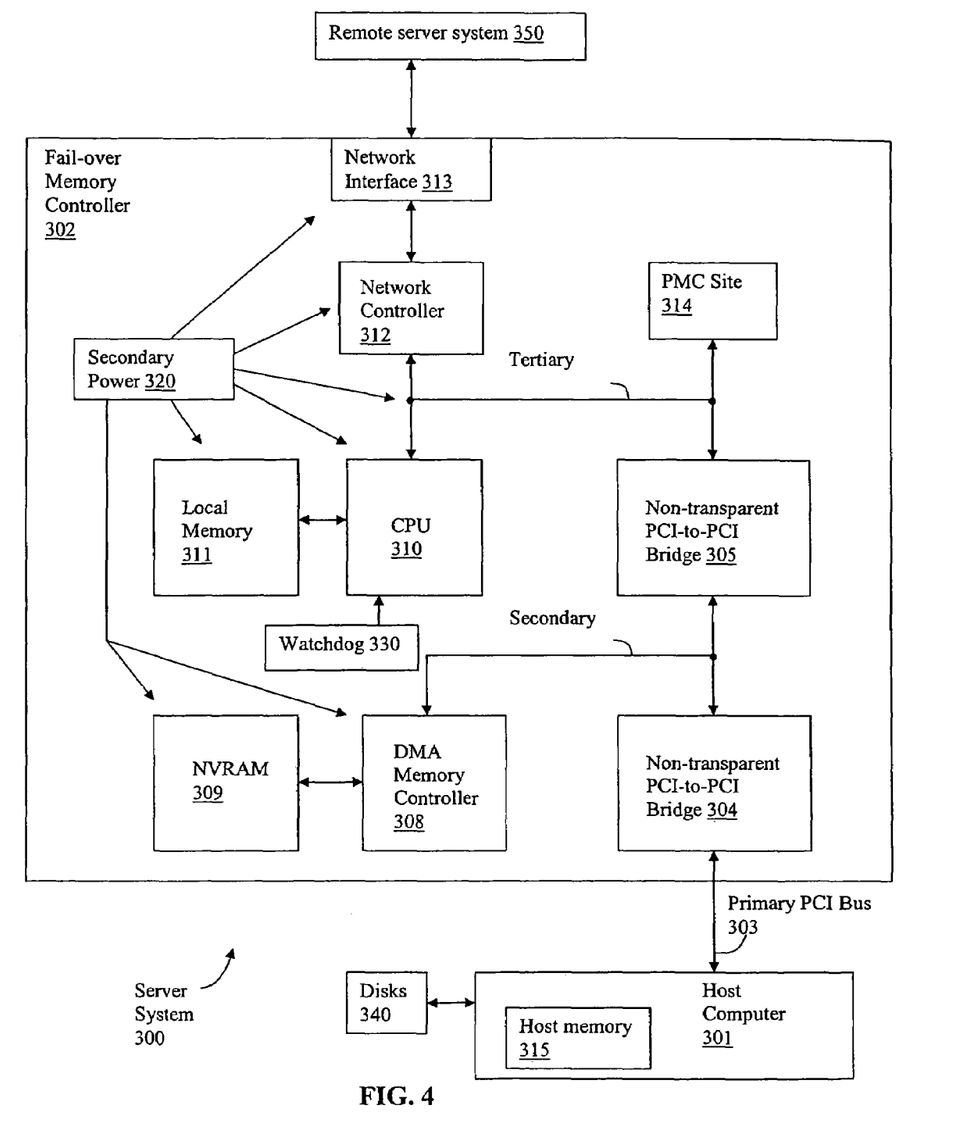
FIG. 4 is a block diagram of a preferred embodiment of the invention.

FIG. 4 illustrates a preferred embodiment of the invention incorporated into a Server System 300. The Host Computer 301 includes a Primary PCI Bus 303, though other bus technologies may be used. Attached to the bus 303 is the Fail-over Memory Controller 302. Within this controller 302 are two local buses, the secondary PCI bus 306 and the tertiary PCI bus 307, though again it is understood that other bus technologies may be used. Non-transparent PCI bridges 304 and 305 connect the primary bus 303 to the secondary bus 306 and the secondary bus 306 to the tertiary bus 307.

The DMA memory controller 308 manages the NVRAM 309. The NVRAM may consist of memory that requires no power to maintain data (such as magnetic memory), battery-backed SDRAM, or other RAM that uses external power. The DMA memory controller 308 includes DMA master capabilities that allow direct memory transfers between NVRAM 309 and host memory 315 or between NVRAM 309 and local memory 311. The host computer 301 or the CPU 310 may program the DMA memory controller 308. Interrupts resulting from DMA operations are routed to be sure that the interrupts go to the processor that requested the transfer.

Most of the controller 302 can be powered either through the primary bus 303 or through secondary power such as batteries or an external universal power supply (UPS). This secondary power 320 enables most of the controller 302 to continue operating even when power through the primary bus 303 has failed. In the preferred embodiment, some components such as the CPU 310 may be powered directly through from the secondary power while others may receive power through the buses 306 and 307. For example the PMC site 314 receives power from the tertiary bus 307.

The controller 302 contains a network controller 312 and associated network interface 313. In the preferred embodiment, this may be a gigabit Ethernet device, but other communication devices are possible. The network controller 312 can operate from the secondary power supply 320. When the host computer 301 fails perhaps due to loss of power, the embedded CPU 310 may copy data from the NVRAM 309 to a remote server system 350 via this network device 312. This copy is called NVRAM fail-over. This may be used to preserve the data for longer times than can be sustained by batteries or to allow the remote server system 350 to use the data to recover the state of the server system 300 and take over operations of the server system 300.

Once a fail-over operation occurs, the remote server system 350 can use the data it receives to take over operations of the failed host computer 301. For example, the NVRAM data may contain a journal of transactions that must be completed together. Completing these transactions involves sending the data to disks 340. The remote server system 350 may be able to access the disks 340 of the local host computer 301. The remote server system 350 may then replay the journal that it retrieves from NVRAM to bring the disks 340 to a consistent state from which it may begin processing new transactions.

Alternately, the data in NVRAM 309 may be stored on storage devices such as disks or flash memory connected to PMC site 314, or the data may be sent to a remote server 350 for storage. When the host computer 301 recovers from its failure, data may no longer be valid in NVRAM due to batteries running out of charge. In such a case, the data can be retrieved from disks, flash memory or the remote server. In this case, the fail-over operation is being used to extend the lifetime of the data in NVRAM 309.

To receive the fail-over data, the remote server system 350 may use a push or pull method. The fail-over memory controller 302 on the fail host computer 301 may send messages to the remote server system 350 with the data and then periodically wait for acknowledgements of receipt (push method), or the remote server system 350 may send requests for NVRAM data to which the controller 302 responds.

The CPU 310 may be programmed to check system integrity to determine if the host computer 301 is functioning properly. Upon finding a problem, the controller 302 may initiate a fail-over operation. Alternately, the controller 302 may be informed of a failure via the network interface 313. In that case, the controller 302 has no responsibility to detect the failure, but it still operates the fail-over in the same manner as if it detected the failure.

In another embodiment of the invention, the network interface 313 is used to keep an almost up-to-date copy of NVRAM 309 on another server system. To keep another server system completely up-to-date would require waiting for acknowledgement from the other system via the network interface 313 before any write to NVRAM may be considered complete. That would slow down the use of the NVRAM 309 and defeat its purpose. Instead it is sufficient to send only some of the data to the other server system, and that data may be sent asynchronously with respect to acknowledgement to the host computer 301. Its transmission may be delayed arbitrarily, yet the host computer 301 may be told immediately that the data is safe. Because the data in NVRAM 309, the embedded CPU 310, and the network controller 312 will survive a failure of the host computer including a loss of power, it is not necessary to keep the other server system completely up-to-date. It is only necessary to keep track of which data remains to be sent. Upon failure of the host computer 301, any remaining un-transmitted data may be sent to the other server system to bring it fully up-to-date. Because the data is almost up-to-date, the copy takes much less time than with the NVRAM fail-over described above.

Figure 5A:
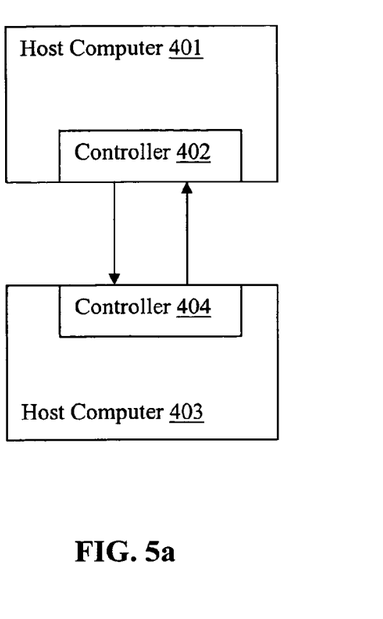
FIGS. 5a, 5b and 5c illustrate possible network topologies for using the invention.

In the preferred embodiment of the invention, a cluster of host computers each have an NVRAM fail-over controller, as shown in FIG. 5. FIG. 5a shows a simple cluster of two host computers. Host computer 401 only uses half of the NVRAM in its fail-over controller 402 to store data. Similarly, host computer 403 only uses half of the NVRAM in its fail-over controller 404 to store data. A single two-way communication path or two one-way communication paths connect the NVRAM fail-over controllers. If host computer 401 fails, its NVRAM data on controller 402 is sent to the unused half of the controller 404. Similarly, if host computer 403 fails, its NVRAM data on controller 404 is sent to the unused half of the controller 402.

Figure 5B:
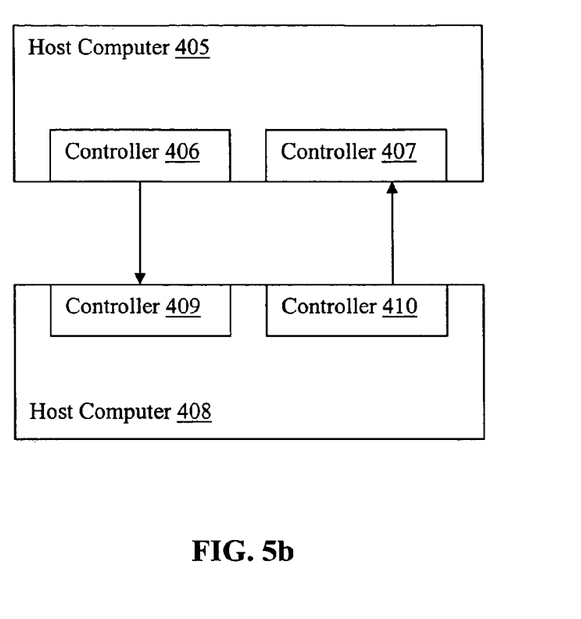
Figure 5C:
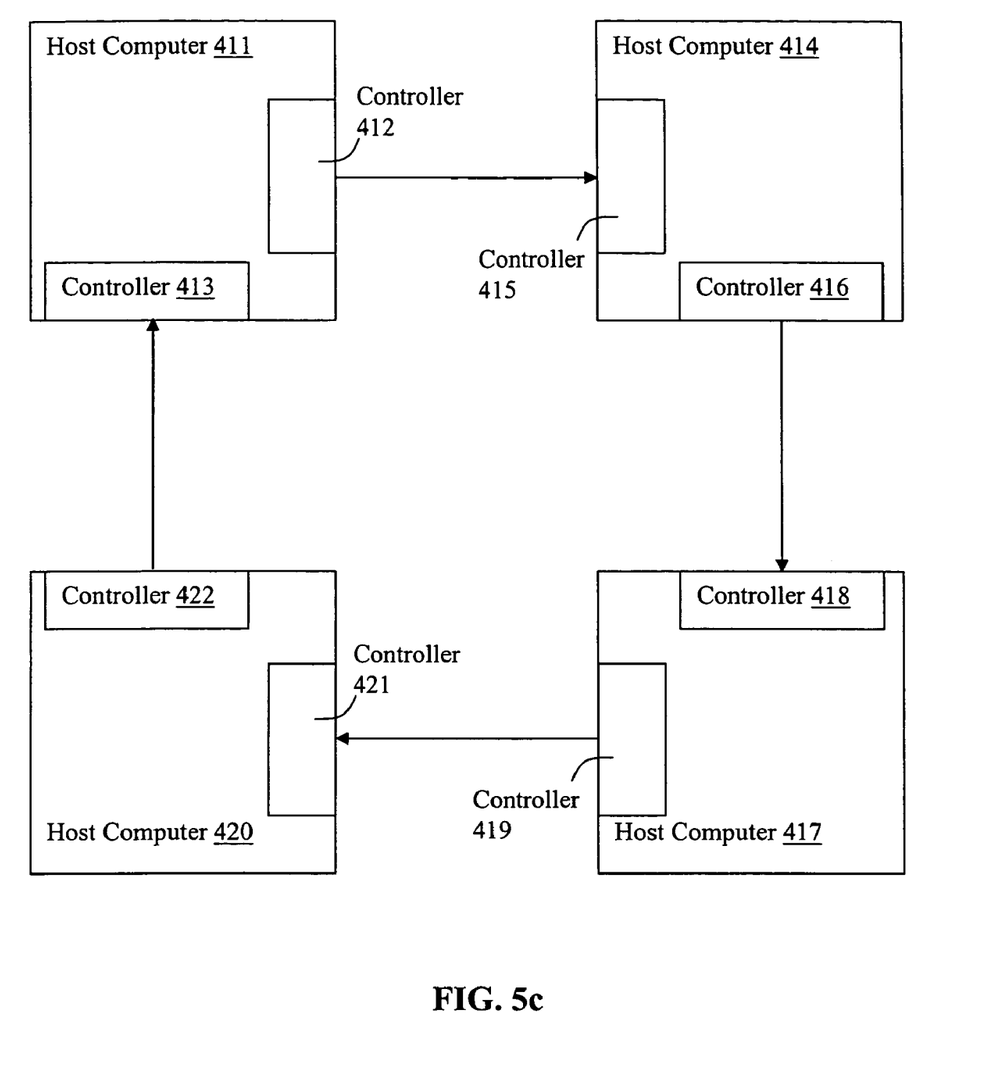

In the preferred embodiment of the invention, each host computer has two fail-over controllers, as shown in FIGS. 5b and 5c. In FIG. 5b, host computer 405 saves data in controller 406. If host computer 405 fails, NVRAM data in controller 406 is sent to controller 409. Host computer 408 saves data in controller 410. If host computer 408 fails, NVRAM data in controller 410 is sent to controller 407. FIG. 5c shows the same idea extended to 4 host computers. Each uses one controller to save its own data, and one controller to receive data from another host computer when the latter fails. For example, host computer 411 saves data in controller 412, and said data is sent to controller 415 on host 414 when host 411 fails. Host 411 uses controller 413 to receive data from controller 422 when host 420 fails.

Each of the diagrams in FIG. 5 shows a static configuration, but it is to be understood that the configuration may be dynamically changed depending on which computers are currently available on the network. The network may allow any host to connect to any other host. The host to which to fail-over may not even be chosen until a failure occurs and a fail-over operation must begin.

The preferred embodiment of the NVRAM controller shown in FIG. 4 also includes a PCI Mezzanine Card (PMC) interface 314. A variety of standard PCI-compatible devices may be attached here. For example, in addition to the network interface 312 that is under the control of the embedded CPU 310, it may be useful to add a second network interface at the PMC site 314 that is under the control of the host computer 301. A fail-over memory controller 302 so equipped may be placed into a host computer 301 in place of a standard PCI network interface. PCI interface connections in a host computer 301 are often in short supply, so having an extra network interface on the controller 302 thus allows it to be added to the host computer 301 without using up any additional PCI interface connections.

Another use for the PMC site 314 is to attach this to long-term storage devices such as disks. Data in NVRAM 309 can be preserved on such devices for longer than can be sustained by batteries. The NVRAM can also be used as a cache for data that the host computer 301 stores on these devices. The storage devices may be under the control of host computer 301. A preferred embodiment of the invention is to use such a configuration as a RAID controller that also provides an NVRAM cache under the control of the host computer 301. Alternately, the storage devices may be under the control of CPU 310. This configuration may allow CPU 310 to serve as a RAID controller or it may allow CPU 310 to preserve NVRAM during longer outages than can be sustained by batteries.

The Bridges 304 and 305 that connect the buses are non-transparent bridges that allow the bus on one side to operate while the bus on the other side is not operating and may not even have power. This provides a firewall that improves system reliability by isolating faults. In particular, if CPU 310 determines or is told by a system administrator or by a network message from another host that host computer 301 is not functioning, CPU 310 can program bridge 304 to prevent the host computer 301 from interfering with recovery operations by controller 302. This may also serve to prevent recovery operations on controller 302 from interfering with operations to restore host computer 301 to service.

The firewall may also function in the opposite direction. If host computer 301 determines or is told by a system administrator that controller 302 is not functioning, host computer 301 can program bridge 304 to prevent the controller 302 from interfering with continuing operations by host computer 301. This may also serve to prevent continuing operations on host computer 301 from interfering with operations to restore controller 302 to service. While the bridge is disabled, host computer must function without being able to use NVRAM 309.

Alternately, the host computer 301 can program bridge 305 to prevent CPU 310 or other components on controller 302 from interfering with continuing operations by host computer 301. This may also serve to prevent continuing operations on host computer 301 from interfering with operations to restore controller 302 to service. In this mode, host computer 301 may still use NVRAM 309, but it will not be able to use fail-over services of controller 302.

In the preferred embodiment, another safety feature is a watchdog timer 330. The CPU 310 must periodically update the timer. If it does not, the timer will reset the CPU 310. The timer is programmed via the PCI bus, so either the host computer 301 or the CPU 310 may control it. The non-transparent bridges 304 and 305 help act to ensure that components of the controller 302 are reset but the host computer 301 is not.

What is claimed is:

1. An NVRAM fail-over system comprising:
   an NVRAM device;

a DMA controller configured to communicate with a host computer and to allow the host computer to program the DMA controller to perform a direct memory transfer between the NVRAM and the host computer; and an embedded processor coupled to a back-up power supply and to the NVRAM, the processor is configured to communicate with both the NVRAM device and the host computer and to not interfere with the host computer to program the NVRAM.

2. The system of claim 1, wherein the embedded processor is configured to determine that the host computer has failed and to transmit NVRAM data to a second computer via a network interface.

3. The system of claim 1, wherein the embedded processor is configured to determine that the host computer has failed and to respond to requests from another computer to transmit part or all of the NVRAM data via a network interface.

4. The system of claim 1, further comprising: a non-transparent bus bridge configured to transfer information between the host computer and the DMA controller.

5. The system of claim 4, wherein the non-transparent bus bridge acts as a firewall to protect one portion of the NVRAM fail-over system from failures on a host computer side of the firewall, wherein the embedded processor is configured to program the non-transparent bus bridge to either forward or not to forward data from the host computer based on an operating status of the host computer.

6. The system of claim 1, further comprising an interface configured to connect with a daughter card.

7. The system of claim 6, wherein the daughter card is a network controller under control of the host computer.

8. The system of claim 6, wherein the daughter card is a disk or RAID controller under control of the host computer.

9. The system of claim 8, wherein the embedded processor is configured to operate as a RAID controller for the host computer along with the daughter card.

10. The system of claim 8, wherein the embedded processor is configured to preserve data stored in the NVRAM during long outages by sending the stored data to the disk coupled to the interface of the daughter card.

11. The system claim 6, wherein the daughter card is a disk or RAID controller under control of the embedded processor.

12. The system of claim 11, wherein the embedded processor is configured to operate as a RAID controller for host computer.

13. The system of claim 11, wherein the embedded processor is configured to preserve data stored in the NVRAM during long outages by sending the stored data to the disk coupled to the interface of the daughter card.

14. The system of claim 1, wherein the embedded processor is configured to preserve data stored in the NVRAM during long outages by sending the stored data to a second host computer coupled to a network interface, thereby allowing the NVRAM to retrieve such data back at a later time.

15. The system of claim 1, wherein the embedded processor is configured to allow a second computer to take over operations from the host computer in communication with the DMA controller, thereby managing storage devices and using network addresses of the host computer.

16. The system of claim 1, wherein the embedded processor is configured to perform the following operations:
inform the host computer that a data transfer to the NVRAM is complete;
inform a second computer that the data stored in the NVRAM is available;
transfer data to the second computer at a suitable time;
keep track of what data still remains to be sent; and
transfering all unsent data to the second computer after the host computer failed.

17. The system of claim 1, further comprising a watchdog timer to reset the embedded processor.

18. The system of claim 1, wherein the embedded processor is configured to allow the host computer to reset the embedded processor.

19. The system of claim 1, further comprising:
a bus interface configured to communicate with the host computer;
a non-transparent bus bridge having a first I/O interface and a second I/O interface, the first I/O interface being coupled to the embedded processor and the second I/O interface being coupled to the NVRAM device and to the bus interface, thereby allowing the host computer to communicate directly with the NVRAM device without passing data between the first and second I/O interfaces, wherein the non-transparent bus bridge is configured to act as a firewall between the first and second I/O interfaces to protect the host computer from failures the first I/O interface side of the firewall by allowing the host computer to program the non-transparent bus bridge to either forward or not to forward data through the non-transparent bus bridge.

* * * * *